Jan. 25, 1955  W. T. GIBBS  2,700,240
FISH LURE
Filed Jan. 13, 1950
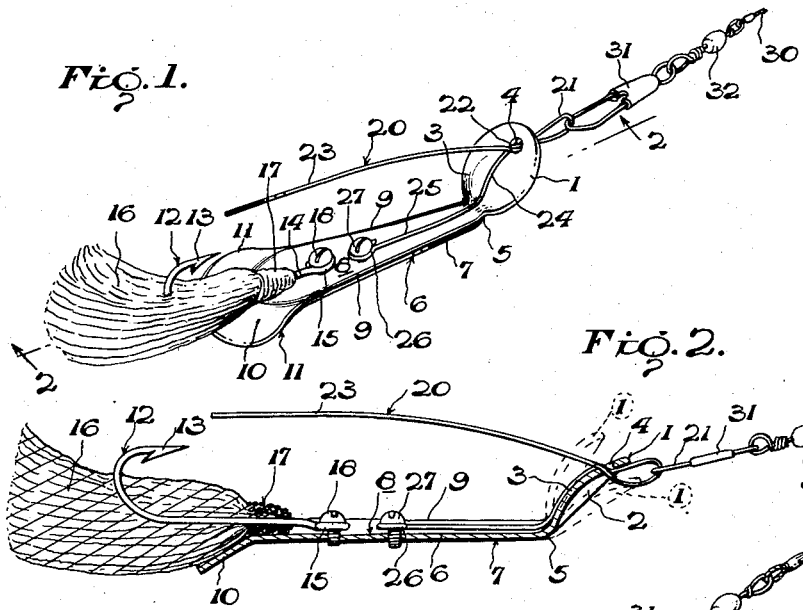
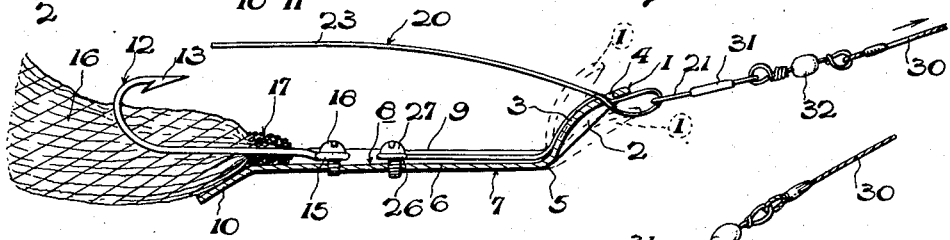
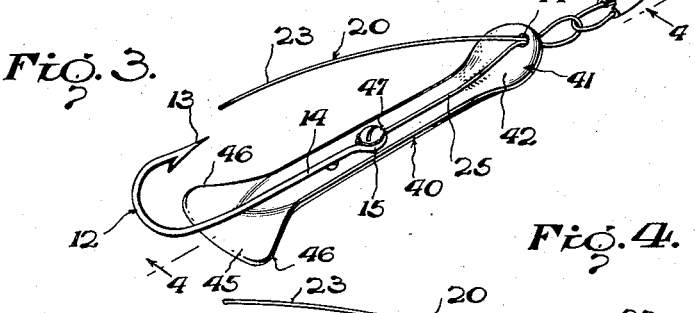
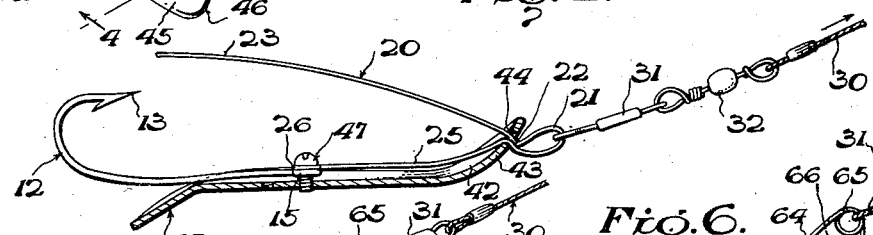
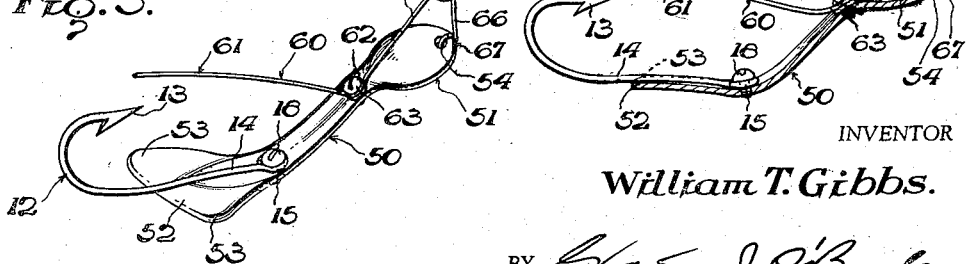
INVENTOR
William T. Gibbs.
BY
ATTORNEY

United States Patent Office 2,700,240
Patented Jan. 25, 1955

2,700,240

FISH LURE

William T. Gibbs, Norfolk, Va.

Application January 13, 1950, Serial No. 138,438

3 Claims. (Cl. 43—42.4)

My invention relates to fish lures, and more particularly to spoon lures of the plug type.

The lures of the present invention are characterized by special structural features, including specially conformed body members having concave or convex head portions, and bilaterally finned tail portions of determined angularity, the special relations between the several parts of the lures determining the nature of the movement imparted thereto, when drawn through the water. By reason of their design, the lures are additionally characterized by freedom from "porpoising," that is to say, they will remain in the water even when trolled at high speeds, they will cast in bullet-like fashion, and they will quickly sink in a life-like manner as soon as they strike the water.

An object of my invention is to provide an improved fish lure.

Another object of my invention is to provide an improved fish lure characterized by freedom from "porpoising" when retrieved or trolled at high speeds.

Yet another object of my invention is to provide an improved fish lure constructed and arranged whereby desired life-like movement is imparted thereto, as it is drawn through the water.

Still another object of my invention is to provide a fish lure designed for comparatively easy casting, and characterized by freedom from spin at normal trolling speeds.

A further object of my invention is to provide a fish lure having an improved weed guard associated therewith.

Yet a further object of my invention is to provide an improved fish lure characterized by a side-to-side slithering movement at substantially all trolling speeds.

A still further object of my invention is to provide an improved fish lure which is strong and sturdy in construction, wherein the fish hook and/or weed guard may be quickly and easily removed and replaced, when it is desired to use a different size hook and associated weed guard.

With these and other objects in view, which may be incident to my improvements, the invention consists in the parts and combinations to be hereinafter set forth and claimed, with the understanding that the several necessary elements, comprising my invention may be varied in construction, proportions and arrangements, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a perspective view of the preferred form of lure.

Fig. 2 is a longitudinal section taken on line 2—2 of Fig. 1;

Fig. 3 is a perspective view of a modified form of lure;

Fig. 4 is a longitudinal section taken on line 4—4 of Fig. 3;

Fig. 5 is a perspective view of another modified form of lure, having a special sidewise or slithering action, and Fig. 6 is a longitudinal section taken on line 6—6 of Fig. 5.

Referring to the drawings, and more particularly to Figs. 1 and 2, a feathered hook is shown mounted on a special spoon member, which is characterized by a forward, curviform action blade or actuator head, set at a positive angle to a grooved body of arcuate cross-section, which terminates in a negatively angled, or depending, flared tail portion forming a stabilizer plane. The actuator head 1 is a generally concavo-convex disk-like portion having a forward concave actuator surface 2, a rear convex surface 3, an opening 4 adjacent the upper periphery of the section, and a base portion 5 formed as a forward continuation of the longitudinally grooved body portion 6. The grooved body 6 has a convexly curved bottom face 7, and a concave upper face 8 terminating in edges 9, which flare out rearwardly to form the sides 11 of the tail piece 10, which is joined to the body at a negative angle, as shown. As indicated in the dotted line showings of Fig. 2, the head or actuator 1 may be varied aproximately 15° from either side of the position shown. The flat fish tail 10 has symmetrical fins or lobes 11, and a generally curvilinear edge. The feather hook 12 includes a hook portion 13, a shaft 14 terminating in an eye 15, and a feather 16 secured about the shaft as indicated at 17. The hook is secured to the plug by any suitable means such as a screw 18, although it may be welded, or soldered in place, if desired.

A weed guard 20, comprising a rod or stainless steel wire member, is twisted upon itself to form a pair of arms connected by a loop 21, the twisted portion 22 passing loosely through and being engaged in the aperture 4 formed in the actuator head. One arm 23 is flexible and has its free end in alignment with and normally juxtaposed to the barb or tip 13 of the fish hook 12 to serve as a weed guard. The second arm 24 of member 20 is conformed to and overlies the convex rear surface of the actuator head 1, and extends rearwardly, as indicated at 25, in the longitudinal axis portion 6 of the plug, terminating in a loop 26, which is secured in place by a screw 27, tapped into the body portion 6 of the plug. A fish line 30 is secured to a snap hook 31 through swivel 32, the snap hook engaging the projecting loop 21 of the weed guard 20.

It will be observed, that the weed guard is formed in one piece and is readily detachable. The novel plug spoon may be made of either chrome or silver plated brass, or of stainless steel, the members being severally die stamped to give the desired convexity to the top surface of the head 1, and the grooved body portion 6, as well as to form the flat fish tail at any desired positive or negative angle to the plane of the body portion. In use, the plug rolls rhythmically 45° to each side of the vertical, while oscillating from side to side. Depending on the speed of the boat, the plug will run at depths of 12 inches to 36 inches below the surface of the water, and at high speeds it will spin, however, the plug will not lift out of the water or "porpoise."

The plug may be made in suitable sizes, ranging from 1 inch to 3 inches in length, or longer, care being taken that the critical length-breadth ratio be retained whatever the size. While the hook is shown with a buck tail, the plug may be utilized with a naked hook. By varying the angularity of the baffle head within an arc of 30°, that is, 15° forward or back of the preferred form indicated in the dotted line showing of Fig. 2, different size baits can be made to operate at increased or decreased depths. In other words, to enable the novel plug spoon to operate at different depths, all that is necessary is to tilt the baffle head 1, forward or back, as desired, within an arc of 30°.

Referring to Figs. 3 and 4, there is shown a modified form of lure, comprising a stamped member of chrome or silver plated brass or stainless steel, ranging in length from 1 inch to 3 inches, and characterized by a grooved body merging into a positive angled, curviform head or actuator having a convex actuating surface, the rear end of the member terminating in a flat fish tail set at a negative angle to the body. The novel plug comprises a longitudinally grooved body portion 40, an actuator head 41, having a concave upper surface 42, with a convex bottom or actuator surface 43, and an opening 44 formed in the head portion of the longitudinal axis of the member, adjacent the periphery thereof. The flat tail piece 45 has the usual rounded lobes or fin sections 46. The weed guard 20 is identical with the form shown in Figs. 1 and 2, and is connected to the leader 30 in the manner previously described. While the body portion 40 is shown tapped to receive two screws, it will be noted that a single screw 47 secures both the loop 26 of wire guard 20, and the eye 15 of the barbed fish hook 12. In this form also, the arm 23 of the weed guard overlies and protects the barb 13 of the fish hook. This form of lure is characterized by a rhythmical rolling action, rolling rhythmically 45° to each side of the vertical, and runs at a depth of 12 inches to 36 inches, depedending on the speed. The plug does not spin at normal fishing speeds, the depth at which it may be operated is variable, and it does not tend to "porpoise" at any speed. With respect to its operation, it is not to be confused with the plug of Fig. 1, in that the latter is characterized by a slow wobble with a combined wobble and roll, plus spin at high speeds.

The modified form of lure shown in Figs. 5 and 6, is characterized by a slithering action, in that it will slide from side to side without either roll or wobble. The lure includes a grooved body portion 50, generally elongated in shape, terminating in a dished actuating head portion 51 and a flat tail portion 52 having the usual side lobes 53. The head portion and the tail portion are respectively formed at a negative and a positive angle to the body portion, in contradistinction to the forms of Figs. 1 and 3. The head portion 51 is apertured as indicated at 54, and an aperture is formed in the body portion, as indicated at 55. The usual hook 12 has its eye 15 secured to the lure by screw 18. In this form of the device, a special weed guard 60, is utilized, comprising a rod or guard portion 61 looped about screw 62, as indicated at 63, and extending upwardly at 64, as shown at 65, to form an eyelet, and being bent downwardly at 66, to terminate in an eye 67, which is engaged in and by the aperture 54 in the head portion of the lure. The line 30 is connected to the loop 65 of this member in the usual manner. It will be noted that in this form of construction, the loop 65 is coincident with the longitudinal axis of the body, and the horizontal plane of the bottom of the groove of the body, whereby the trolling, or tractive force, is applied above the dished face of the head portion, and along the longitudinal axis of the body, tending to stabilize the member both vertically and horizontally in the water as the lure is trolled, whereby its motion about the pivot 65 is restricted to oscillation in a substantially uniform horizontal plane. However, such action, coupled with its forward travel, results in side slip, or so-called "slithering" forward motion.

Thus, this form of plug tends to ride on a relatively even keel, no matter what the speed, and, as noted, is characterized solely by a slithering, or side to side action, free from spin, roll and wobble. It will be noted that the combination weed guard and traction members are readily detachable and replaceable. It will be further noted that the operation of the plugs may be varied in a simple and efficient manner by varying the aspect of the forward sides or actuator portions in the form shown in Figs. 1 and 2, or by varying the position and spacing of the loop 65 of the guard member in the form illustrated in Figs. 5 and 6.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

The description of the angularity of the body portion of the lure, as used herein, namely, by means of the terms "positive angle," "negative angle," "positively angled" and "negatively angled," is in accordance with the trigonometric definitions of positive and negative angles, that is to say, positive when measured counter-clockwise with respect to a horizontal reference line, and negative when measured clockwise with respect to the reference line.

What is claimed is:

1. A fish lure comprising an elongated, arcuately grooved body merging at one end into a dished actuator head having a curviform actuating surface, and merging at the other end into a flat fish tail, said head and said tail having respectively different angles of elevation and depression with respect to said body, said head having an opening therein to receive a fish line securing means comprising a wire member having a loop portion and a pair of arms terminating in free ends, said arms extending loosely through the opening in the head and rearwardly therefrom over the body portion of the lure, the loop portion being forward of the arcuate head, the free end of one of the arms being secured to the body portion of the lure in the longitudinal axis thereof, the free end of the other of said arms forming a weed guard, and a fish hook rigidly secured to the body in the vicinity of the tail end thereof.

2. A fish lure comprising a substantially straight, elongated body member of arcuate cross-section merging at one end into a positively angled, dished actuator head having a concavely curviform actuating surface, and merging at the other end into a negatively angled, flat fish tail, fish line securing means at the leading edge of the actuator head comprising a wire member having a loop portion and a pair of arms terminating in free ends said arms extending loosely through the actuator head and rearwardly therefrom over the body portion of the lure, the loop portion being forward of the head, the free end of one of the arms being secured to the body portion in the longitudinal axis thereof, the free end of the other of said arms forming a weed guard, and a fish hook secured to the tail end of the body.

3. A fish lure characterized by wobble and roll at normal trolling speeds, and by spin at high speeds, comprising a grooved body member merging at its forward end into a positively angled, dished actuator head having a concavely curviform actuating surface, and flaring toward its rear end to merge into a negatively angled, flat fish tail, fish line securing means at the leading edge of the actuator head comprising a wire member having a loop portion and a pair of arms terminating in free ends said arms extending loosely through the actuator head and rearwardly therefrom over the body portion of the lure, the loop portion being forward of the head, the free end of one of the arms being secured to the body portion in the longitudinal axis thereof, the free end of the other of said arms forming a weed guard, a fish hook secured to the tail end of the body, and a swivel connected line connected to said fish line securing means.

References Cited in the file of this patent

UNITED STATES PATENTS

| Number | Name | Date |
|---|---|---|
| 1,306,719 | Robertson | June 17, 1919 |
| 1,314,052 | Dubrow | Aug. 26, 1919 |
| 1,615,963 | Stanley | Feb. 1, 1927 |
| 1,638,215 | Rodgers | Aug. 9, 1927 |
| 1,806,088 | Schnell | May 19, 1931 |
| 1,978,875 | Wright | Oct. 30, 1934 |
| 2,023,918 | De Witt | Dec. 10, 1933 |
| 2,124,822 | Johnson | July 26, 1938 |